(12) United States Patent
Holland et al.

(10) Patent No.: US 9,246,686 B1
(45) Date of Patent: Jan. 26, 2016

(54) SALT VALUE SERVICE

(71) Applicant: Amazon Technologies, Inc., Reno, NV (US)

(72) Inventors: Ryan Christopher Holland, Seattle, WA (US); Thomas Charles Stickle, Saint James, NY (US); John Kenneth Beer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 14/307,357

(22) Filed: Jun. 17, 2014

(51) Int. Cl.
*H04L 9/32* (2006.01)
*H04L 29/06* (2006.01)
*H04L 9/08* (2006.01)

(52) U.S. Cl.
CPC ............ *H04L 9/3236* (2013.01); *H04L 9/3226* (2013.01); *H04L 63/083* (2013.01); *H04L 63/12* (2013.01); *H04L 9/0863* (2013.01)

(58) Field of Classification Search
CPC ..... H04L 9/32226; H04L 63/08; H04L 63/12; H04L 9/0863
USPC ........................................................ 713/168
See application file for complete search history.

(56) References Cited

U.S. PATENT DOCUMENTS

| | | | |
|---|---|---|---|
| 8,751,804 B1* | 6/2014 | Nystrom et al. | 713/168 |
| 2002/0087890 A1* | 7/2002 | Chan et al. | 713/202 |
| 2008/0092216 A1* | 4/2008 | Kawano et al. | 726/5 |
| 2014/0032922 A1* | 1/2014 | Spilman | 713/184 |
| 2015/0172272 A1* | 6/2015 | Levner | |
| 2015/0178515 A1* | 6/2015 | Cooley et al. | |

* cited by examiner

*Primary Examiner* — Techane Gergiso
(74) *Attorney, Agent, or Firm* — Thorpe North & Western LLP

(57) ABSTRACT

A technology is described for a salt service. An example method may include generating a salt value and a salt identifier used to reference the salt value in response to a salt value setup request. Storing the salt value in a data store where the salt value may be referenced by the salt identifier. The salt value and the salt identifier may then be provided in response to the salt value setup request to enable the salt identifier to be stored in association with a first hash value generated from the salt value and a customer password for future customer authentications. In response to an authentication request, the salt value may be retrieved from the data store and the salt value may be provided, enabling customer authentication to be performed by comparing the first hash value with a second hash value generated from the salt value and a customer password.

20 Claims, 11 Drawing Sheets

SALT VALUE SERVICE

BACKGROUND

Information security is a general term referring to the practice of defending information from unauthorized access. Access to protected information may be restricted to persons who have been authorized to access the information. Computer systems may be protected from unauthorized access using various mechanisms that control access to the computer systems and the information contained thereon. One such mechanism is user authentication, which may be verifying one's claim of identity. For example, users may identify themselves by providing a username and a password when attempting to access a computer system.

Information security may use cryptography to transform information via encryption into a form that renders the information unusable by persons other than an authorized user. One form of cryptography used to secure information may be a cryptographic hash function that takes a block of data and returns a fixed-size string (i.e., a hash value). For example, a password may be transformed into a hash value using a hash function making the password unreadable by unauthorized individuals. A salt value (i.e., random data) may be used as an additional input to a hash function. By adding a salt value, a resulting hash value may be better defended against dictionary attacks and against pre-computed rainbow table attacks.

DETAILED DESCRIPTION

A technology is described for a service that generates a salt value (e.g., a random value) that may be used as an input to a hash function. The service independently and securely stores the salt value for use in future customer authentications. In one example, applications employing an authentication protocol, such as a password authentication protocol, may send a request to a salt service for setup of a salt value used in establishing customer authentication credentials and a salt identifier used to identify the salt value when a future authentication request is made. The salt value may be a random value that may be combined with a customer password to generate a hash value used to authenticate a customer's password.

In one example configuration, after generating a salt value and a salt identifier, a salt service may then provide the salt value and the salt identifier to a requesting application and store the salt value within the salt service, referenced by the salt identifier, for future authentication requests. The application may then use a cryptographic hash function to generate a hash value from the salt value and a customer password, and the hash value may be used for future customer authentications. When authenticating a customer (e.g., when a customer attempts to login to a system), the application may make an authentication request to the salt service that includes the salt identifier, whereupon receiving the authentication request, the salt service may look up a salt value associated with the salt identifier and return the salt value to the application.

In another example configuration, in response to a setup request, the salt service may use a cryptographic hash function to generate a hash value from a salt value and a customer password. The hash value may be returned to the application and the salt service may then store the salt value referenced by a salt identifier. When authenticating a customer, the salt identifier and a customer password may be included in an authentication request made to the salt service. The salt service may then look up the salt value using the salt identifier, and using the cryptographic hash function, generate a hash value from the salt value and the customer password. The salt service may then return the hash value to the application.

Figure 1:
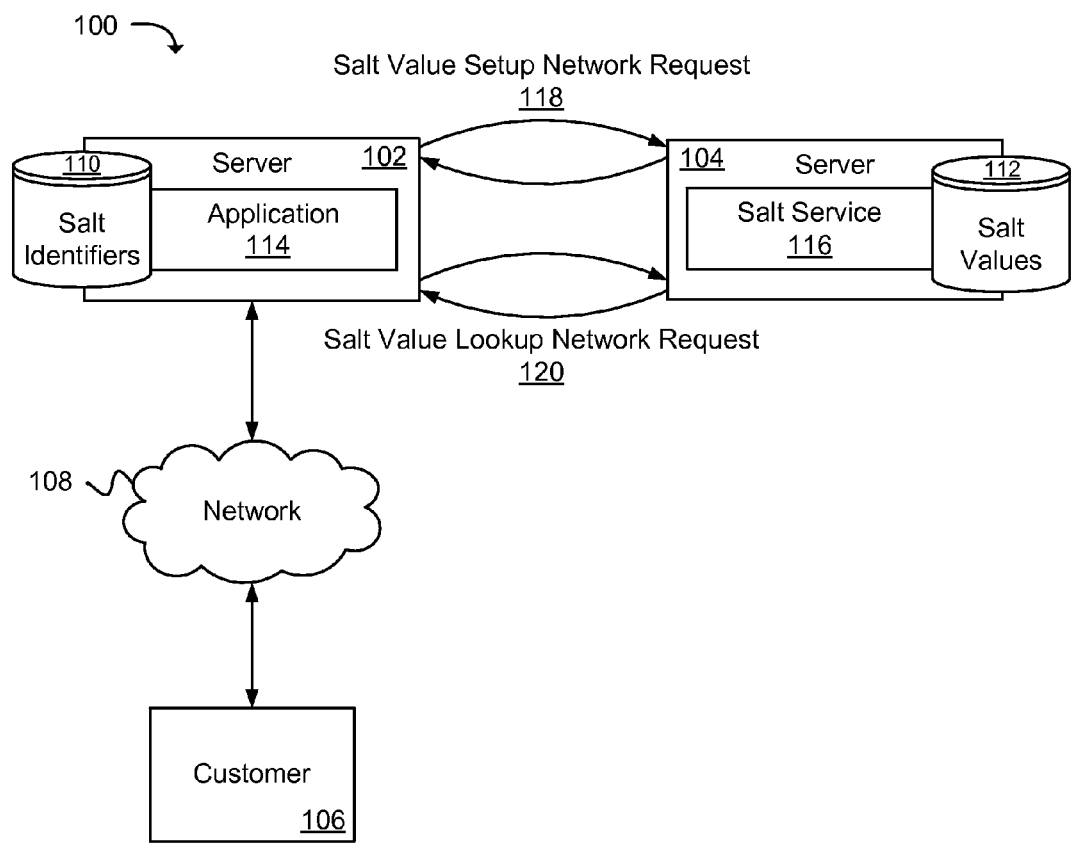
FIG. 1 is a diagram illustrating an example system for a salt service that provides a salt value used as an input to a hash function.

FIG. 1 is a diagram illustrating a high level example of a system 100 for a salt service 116. The salt service 116 may provide applications 114 (e.g., a web application or networked application) with a salt value used as part of a password authentication protocol. A salt value may be a random value or a pseudo-random value that may be used as one input into a cryptographic hash function that generates a hash value used to authenticate a customer. A second input into a hash function may be a customer password or passphrase. Based on the inputs, the hash function may generate a hash value that obfuscates a customer's password. Accordingly, a security breach of a database containing a customer's authentication credentials may not reveal a customer's password in plain text. Further, by including a random salt value as an input along with a customer's password when creating a hash value, any attempt to decipher the hash value (e.g., using a rainbow table) may be hindered. For example, a random salt value may protect a customer password against rainbow table attacks by introducing additional randomness into a customer password.

In one example configuration of the technology, the system 100 may include a server 102 that hosts various applications 114, services, consoles, etc. that may be available to customers 106 via a password authentication protocol. For example, an application 114 may provide a customer interface that a customer 106 can use to submit customer authentication credentials, such as a customer ID (identifier) and a customer password. Customers 106 wishing to obtain access to a system, service, database, etc. may request authentication credentials that can be used to identify a customer 106. In one example, a customer 106 may submit a customer ID (e.g., a username, an identification number or some other access token used to identify a customer 106) and a customer password or passphrase. Authentication credentials may then be created for the customer 106 that may include a customer ID and a hash value generated using the customer password and a salt value obtained from a salt service 116.

An application 114 may interface with a salt service 116 located on a server 104 via a network 108. The salt service 116 may generate salt values 112 in response to a salt value setup network request 118 and store the salt values 112 for future customer password authentications. Network requests made to the salt service 116 may be transmitted over a computing network such as, a local area network (LAN), wide area network (WAN) or a virtual network. In one example configuration, in response to a salt value setup request 118 a salt service 116 may generate a salt value 112 and, in some examples, a salt identifier 110. The salt value 112 may be a random number or a random value of any length. The term random number or value as described in this description also includes pseudo-random numbers or values. The salt identifier 110 may be a customer ID submitted by a customer, an identifier generated by an application 114, or may be a random value generated by the salt service 116.

After generating a salt value 112, the salt service 116 may then return the salt value 112 to the application 114. In an example where the salt service 116 generates a salt identifier 110, the salt service 116 may return both the salt value 112 and the salt identifier 110 to the application. The salt service 116 may store the salt value 112 referenced by the salt identifier 110 for future salt value lookup requests 120 on a local data store contained on a server 104 or on a data store accessible to the salt service 116 that is not accessible to the application 114. Upon receiving the salt value 112, the application 114 may utilize a hash function to generate a hash value using the customer password and the salt value 112 as inputs. The application 114 may then cause the resulting hash value to be stored with the salt identifier 110, where both the hash value and the salt identifier 110 may be referenced using the customer ID. A data store used to store a hash value and salt identifier 110 may be a local data store contained on a server 102 or may be a data store accessible to the application 114, but not the salt service 116.

Having setup authentication credentials for a customer 106, the authentication credentials may be used to identify the customer 106 when the customer 106 presents the authentication credentials to the application 114. For example, a customer 106 may provide the customer ID and customer password that were used to setup the customer's authentication credentials. Upon receiving the customer ID and customer password, the application 114 may cause a salt identifier 110 and a stored hash value associated with the customer 106 to be retrieved from a data store. A salt value lookup request 120 may then be made to the salt service 116. Included in the salt value lookup request 120 may be the salt identifier 110. Upon receiving the salt value lookup request 120, the salt service 116 may identify the salt value 112 associated with the salt identifier 110. The salt value 112 may then be returned to the application 114, whereupon the customer password and the salt value 112 may be used as inputs to a hash function that generates a hash value. The application 114 may then cause the hash value to be compared to the stored hash value referenced by the customer ID. In a case where the hash value and the stored hash value match, the identity of the customer 106 has been authenticated. In a case where the hash value and the stored hash value do not match, authentication of the customer 106 has failed.

In another example configuration, rather than provide an application 114 with a salt value 112, a salt service 116 may provide the application with a salted hash value. Illustratively, upon receiving a salt value setup request 118 that includes a customer password, the salt service 116 may generate a salt value 112, and then utilizing a hash function, generate a hash value using the salt value 112 and the customer password as inputs, and the salted hash value may then be returned to the application 114. As a specific example, an application 114 may cause a salt value setup request 118 to be made to a salt service 116 that includes a customer password. The salt service 116 may then generate a salt value 112 and a salt identifier 110. The salt service 116 may cause the salt value 112 to be stored for future salt value lookup requests 120 where the salt value 112 may be referenced by the salt identifier 110. The salt service 116, using a cryptographic hash function, may generate a hash value from the salt value 112 and the customer password included in the salt value setup request 118. The hash value may then be returned to the application 114. The application 114 may then cause the hash value to be stored with the salt identifier 110 referenced by a customer ID for future customer authentications.

When authenticating a customer's authentication credentials, the application 114 may identify a salt identifier 110 associated with a customer 106 and include the salt identifier 110 and a customer password in a salt value lookup request 120. Upon receiving the salt value lookup request 120, the salt service 116 may cause a salt value 112 associated with the salt identifier 110 to be retrieved from a data store. Using the hash function, the salt service 116 may then cause a hash value to be generated from the salt value 112 and the customer password included in the salt value lookup request 120. The hash value may then be returned to the application 114, whereupon the application 114 may cause the returned hash value to be compared to a stored hash value referenced by the customer ID. Authentication of the customer 106 may be successful when the hash value and the stored hash value match.

In some example configurations, communications between an application 114 and a salt service 116 may be subject to an authentication policy used to validate an identity of a server 102 hosting the application 114 or the identity of the application 114. In one example, a request from an application 114 to a salt service 116 may be predicated upon the request including correct authentication credentials. Examples of authentication credentials that an application 114 may provide in a request include shot-term authentication credentials, as described later in association with FIG. 7. Another example of a method that may be used to authenticate a server 102 may be whitelisting, where the salt service 116 accepts requests from servers 102 having a network address matching those network addresses included in a trusted network address list. Further, a method may be used to deny salt value related requests from an application 114 when suspicious activity is detected via a suspicious activity trigger (e.g., a maximum number of requests per second trigger).

For the purpose of convenience, an application 114 is described above as interfacing with a salt service 116. It is understood that systems, services, modules etc. other than the application 114 described in this disclosure may interface with the salt service 116 for the purpose of obtaining a salt value 112 as described herein.

Figure 2A:
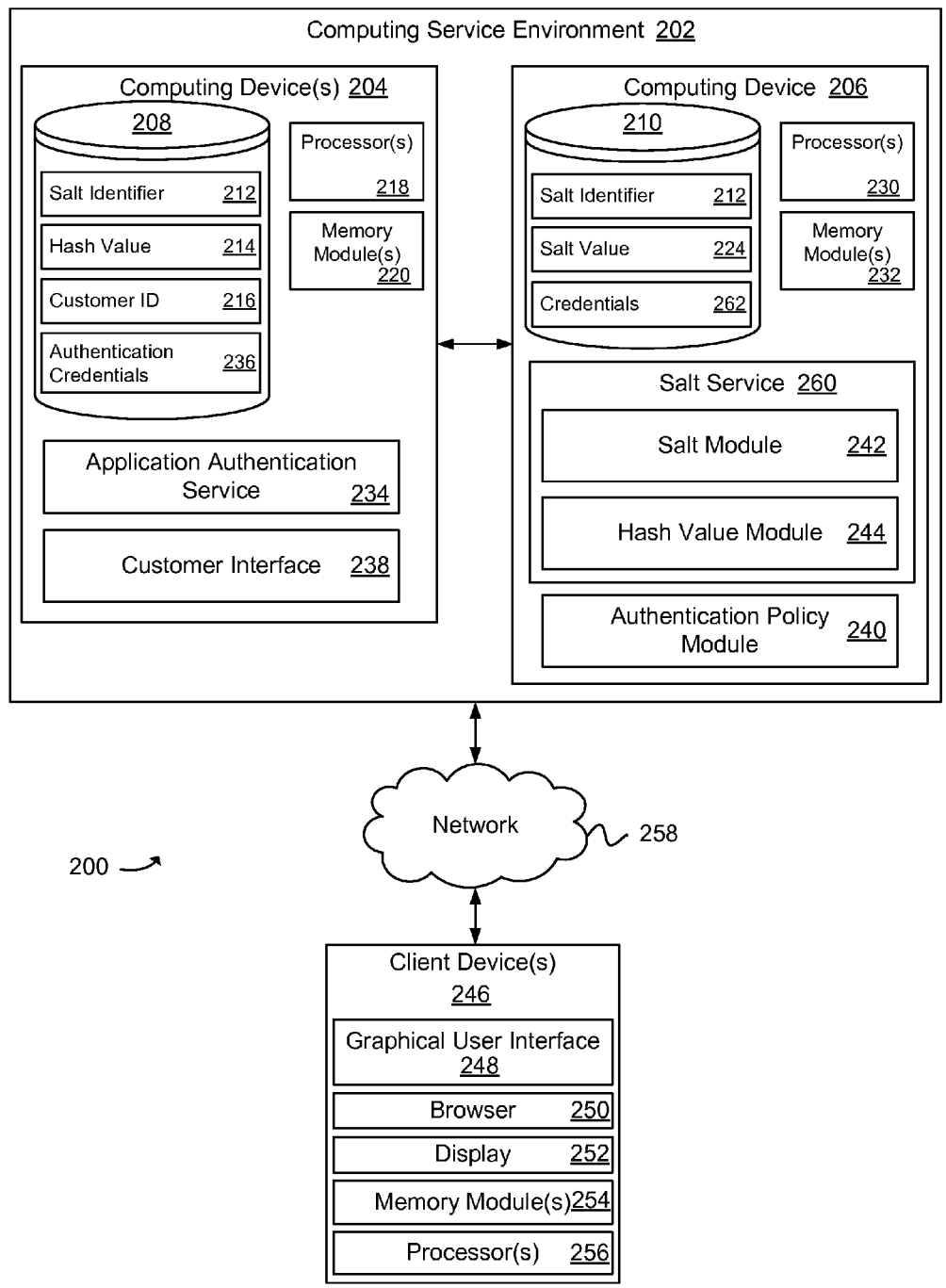
FIG. 2a is a block diagram illustrating an example system for a salt service that provides a salt value in response to authentication requests.

FIG. 2*a* illustrates an example of various components of a system 200 on which the present technology may be executed. In one example configuration, the system 200 may include a computing service environment 202 containing a number of computing devices 204 and 206. The computing devices 204 and/or 206 may be servers that may be in communication by way of one or more computing networks, such as a local area network (LAN), wide area network (WAN) or a virtual network. As illustrated, one or more computing devices 204 may be servers (e.g., web servers) accessible to a number of client devices 246 providing network accessible services to the client devices 246. The computing device 206 may be a server providing a salt system that includes a salt service 260 to other computing devices 204 included in the computing service environment 202.

In one example configuration, a computing device 204 may include a data store 208, an application authentication service 234, a customer interface 238, as well as other services, processes, systems, engines, or functionality not discussed in detail herein. The computing device 204 may be used to host websites, network accessible data storage, network accessible applications, email services, or other network accessible services available to customers via client devices 246. The client devices 246 may access the computing device 204 over a communications network 258, such as the Internet.

The application authentication service 234 may be used to authenticate customers wishing to access the computing device 204 or an application hosted by the computing device 204. Illustratively, a customer, using a client device 246, may access the computing device 204 via the customer interface 238, whereupon the customer may be prompted to provide authentication credentials. For example, a customer login page may be provided to the client device 246 prompting a customer for a customer ID and a customer password. A returning customer may provide a customer ID and customer password, and a customer seeking to access the computing device 204 for a first time may setup a customer ID and customer password. Authentication credentials provided by a customer may be sent to the application authentication service 234 (e.g., via an API (Application Programming Interface)) in order to verify the identity of the customer. The application authentication service 234 may verify the customer's authentication credentials by comparing a stored hash value 214 associated with a customer ID 216 with a hash value generated by the application authentication service 234 using the customer password submitted by the customer and a salt value 224 obtained from the salt service 260. If the stored hash value 214 and the generated hash value match, then the customer has been authenticated and may be allowed to access the computing device 204.

In one example configuration, the application authentication service 234 may be used to setup a new customer by requesting a salt value 224 from a salt service 260 provided by a salt service 260 hosted by the computing device 206. The application authentication service 234 may send an API request for salt value setup to the salt service 260, whereupon the salt service 260 may generate a salt value 224 and a salt identifier 212 and return the salt value 224 and the salt identifier 212 to the authentication service 234. The application authentication service 234 may then use a hash function to generate a hash value 214 using the salt value 224 and a customer password provided by the customer. The hash value 214 and the salt identifier 212 may then be stored in a data store 208 accessible to the application authentication service 234 where the hash value 214 and the salt identifier 212 may be referenced by a customer ID 216.

When authenticating the customer, the application authentication service 234 may use a customer ID 216 provided by the customer to retrieve the stored hash value 214 and the salt identifier 212 from the data store 208 and then send an API request for salt value authentication to the salt service 260. The API request may include the salt identifier 212. The salt service 260 may retrieve the salt value 224 associated with the salt identifier 212 from the data store 210 and return the salt value 224 to the authentication service 234, whereupon the application authentication service 234 may use a hash function to generate a hash value using the salt value 224 and a customer password provided by the customer. The generated hash value may then be compared to the stored hash value 214.

In another example configuration, the application authentication service 234 may be used to setup a new account or customer by requesting a hash value 214 from the salt service 260. The application authentication service 234 may send an API request for salt value setup to the salt service 260 that includes a customer password that may be used by the salt service 260 to generate a hash value 214 using the customer password and a salt value 224. The salt service 260 may then return to the application authentication service 234 a hash value 214 and a salt identifier 212, where the salt identifier identifies the salt value 224 used to generate the hash value 214. The application authentication service 234 may store the hash value 214 and the salt identifier 212 referenced by a customer ID 216.

To authenticate the customer, the application authentication service 234 may use the customer ID 216 to retrieve the stored hash value 214 and the salt identifier 212 from the data store 208 and send an API request for authentication to the salt service 260 that includes the salt identifier 212 and a customer password provided by the customer. The salt service 260 may then return a hash value generated from a salt value 224 associated with the salt identifier 212 and the customer password to the authentication service 234. The application authentication service 234 may then verify the identity of the customer by comparing the hash value returned by the salt service 260 with the stored hash value 214.

In one example configuration, a salt service 260 may include a salt module 242 that may generate a salt value 224 and a salt identifier 212 in response to an API request for salt value set up. The salt value 224 may be a random value of any length. In one example, a computing service operator may determine a length of a salt value 224. In addition, the salt identifier 212 may be a random value or may be determined based on an identity of a customer (e.g., a customer ID 216 may be used as a salt identifier 212). After generating a salt value 224 and a salt identifier 212, the salt module 242 may store the salt value 224 and salt identifier 212 in a data store 210 for future requests for authentication. The salt value 224 and salt identifier 212 may then be returned to a computing device 204. When responding to an API request for authentication, the salt service 260 may perform a lookup of the salt value 224 using a salt identifier 212 included in the API request for authentication. The salt value 224 may then be returned to the computing device 204 associated with the API request for authentication.

In another example configuration, a salt service 260 may also include a hash value module 244 that may be in addition to a salt module 242. In response to an API request for salt value set up, the salt module 242 may generate and store a salt value 224 and a salt identifier 212 as described above. Included in the API request for salt value setup may be a customer password. The salt value 224 and the customer password may then be provided to the hash value module 244, whereupon a hash value 214 may be generated from the salt value 224 and the customer password. The hash value 214 and the salt identifier 212 may be returned to the computing device 204 associated with the API request for salt value set up.

An API request for authentication made to the salt service 260 may include a salt identifier 212 and a customer password provided by a customer. A salt value 224 associated with the salt identifier 212 may be retrieved from the data store 210, and the salt value 224 and the customer password may be provided to the hash value module 244. The hash value module 244 may then be used to generate a hash value from the salt value 224 and the customer password using a hash function. The hash value may then be returned to a computing device 204 associated with the API request for authentication where the hash value may be compared to a stored hash value 214.

Figure 7:
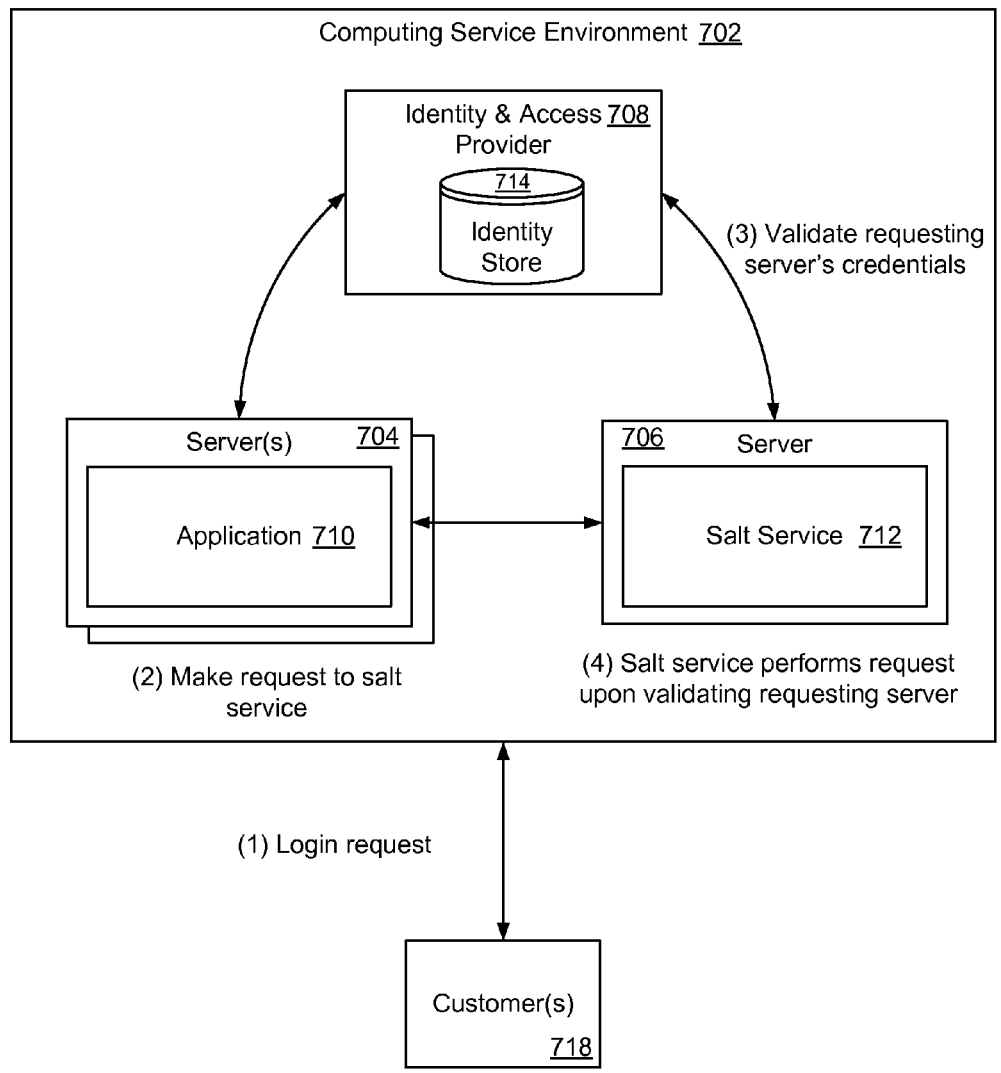
FIG. 7 is a diagram illustrating an example system and method for validating a computing device making a salt value request using an authentication policy.

In some example configurations, authentication credentials 236 may specify credentials that are used to validate a computing device 204 making an API request for salt value setup or authentication. As an example, the authentication policy 236 may specify short-term authentication credentials and/or network address credentials. This additional layer of security can prevent unauthorized applications or computing devices from accessing the salt service 260. Illustratively, short-term authentication credentials may be temporary security credentials that include a security token that may be valid for a specified duration and for a specific set of permissions (e.g., customer roles). Network address credentials may specify particular network addresses (e.g., an IP address) from which API requests may originate. In one example configuration, a computing device 204 may access an authentication policy 236, which may be referenced to determine what kind of credentials (e.g., short-term authentication credentials) to include in an API request made from the computing device 204 to a salt service 260. Upon receiving an API request from a computing device 204, an authentication policy module 240 included on a computing device 206 hosting a salt service 260 may be used to check the credentials of the computing device 204 associated with the API request by comparing the credentials with stored credentials 262 associated with the computing device 204. If the credentials match, then the API request may be forwarded to the salt service 260. In another example configuration, an identity and access provider may authenticate computing devices 204 as illustrated in FIG. 7.

Alternatively, or in addition to checking short-term credentials, the authentication policy module 240 may specify a policy that compares a network address of a computing device 204 making an API request with stored credentials 262 that may include a list of approved network addresses (e.g., a whitelist). If the network address is included in the list of approved network addresses, the API request may be forwarded to the salt service 260. Also, in some examples a blacklist may be used.

A client device 246 used by a customer to access a computing device 204 may include any device capable of sending and receiving data over a communications network 258. A client device 246 may comprise, for example a processor-based system such as a computing device. Such a computing device may contain one or more processors 256, one or more memory modules 254 and a graphical user interface 248. A client device 246 may be a device such as, but not limited to, a desktop computer, laptop or notebook computer, tablet computer, mainframe computer system, handheld computer, workstation, network computer, or other devices with like capability. A client device 246 may include a browser 250 that may enable the client device 246 to access a computing device 204 by way of a server side executed customer interface 238. The client device 246 may include a display 252, such as a liquid crystal display (LCD) screen, gas plasma-based flat panel display, LCD projector, cathode ray tube (CRT), or other types of display devices, etc.

The various processes and/or other functionality contained on the computing devices 204 and 206 may be executed on one or more processors 218 and 230 that are in communication with one or more memory modules 220 and 232 respectively according to various examples. The computing devices 204 and 206 may comprise, for example, of a server or any other system providing computing capability. Alternatively, a number of computing devices 204 and 206 may be employed that are arranged, for example, in one or more server banks or computer banks or other arrangements. For purposes of convenience, the computing device 206 is referred to in the singular. However, it is understood that a plurality of computing devices 206 may be employed in the various arrangements as described above.

Various data may be stored in data stores 208 and 210 that are accessible to the computing devices 204 and 206. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data stores 208 and 210 may include storage systems such as a SAN (Storage Area Network), cloud storage network, volatile or non-volatile RAM, optical media, or hard-drive type media. The data stores 208 and 210 may be representative of a plurality of data stores 208 and 210 as can be appreciated.

The network 258 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 2B:
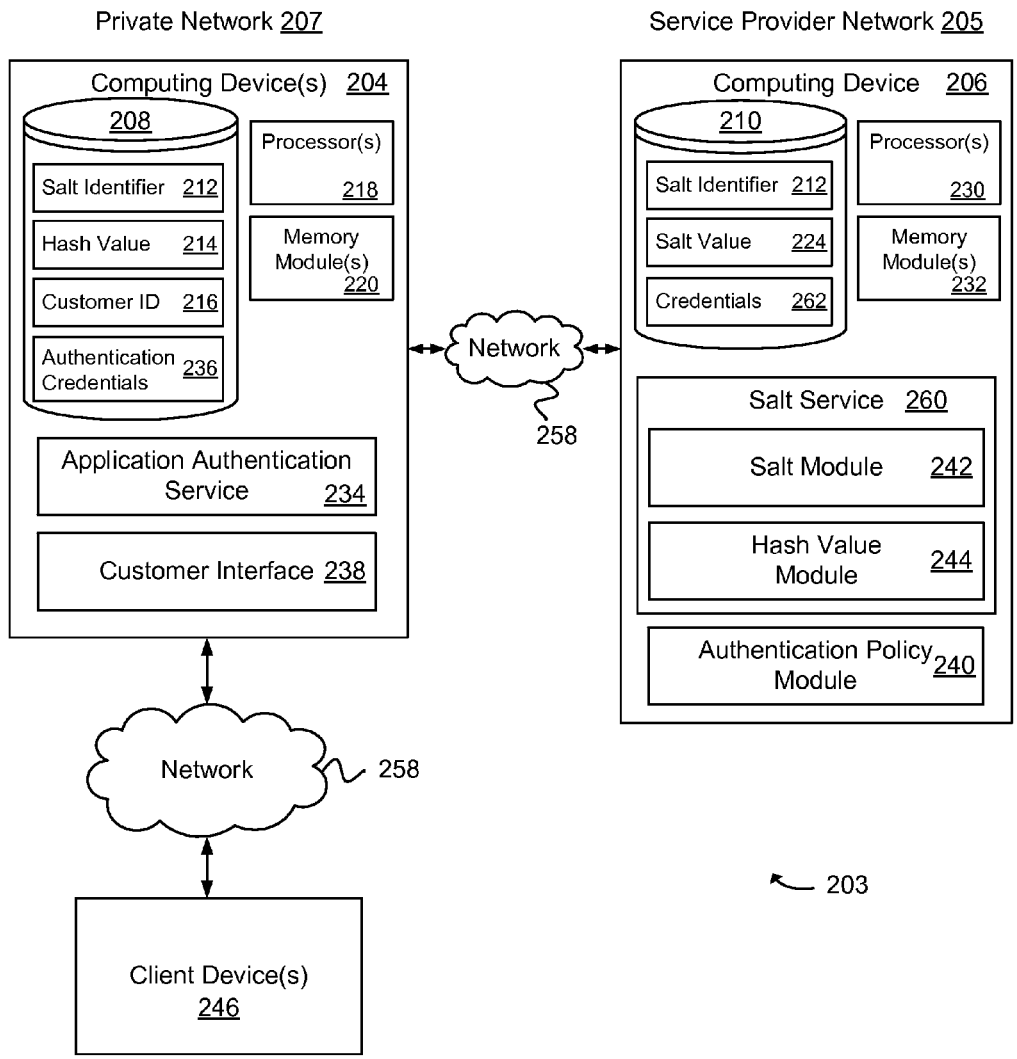
FIG. 2b is a block diagram illustrating another example system for a salt service made available by a service provider network.

FIG. 2b illustrates another example of a system 203 on which the salt service 260 may be executed. In particular, FIG. 2b illustrates that the salt service 260 may be located within a service provider network 205 and the application authentication service 234 may be located within a private network 207. For example, the salt service 206 may be a third-party provided service owned or controlled by an entity that is separate from an entity owning or controlling the private network 207. As a result, if an attacker gains access to the private network 207, the attacker may not gain access to the service provider network 205 with the salt service 260.

FIGS. 2a and 2b illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An API may be provided for each module to enable a second module to send requests to and receive output from the first module. Such APIs may also allow third parties to interface with the module and make requests and receive output from the modules. While FIGS. 2a and 2b illustrate examples of systems that may implement the techniques above, many other similar or different environments are possible. The example environments discussed and illustrated above are merely representative and not limiting.

Figure 3:
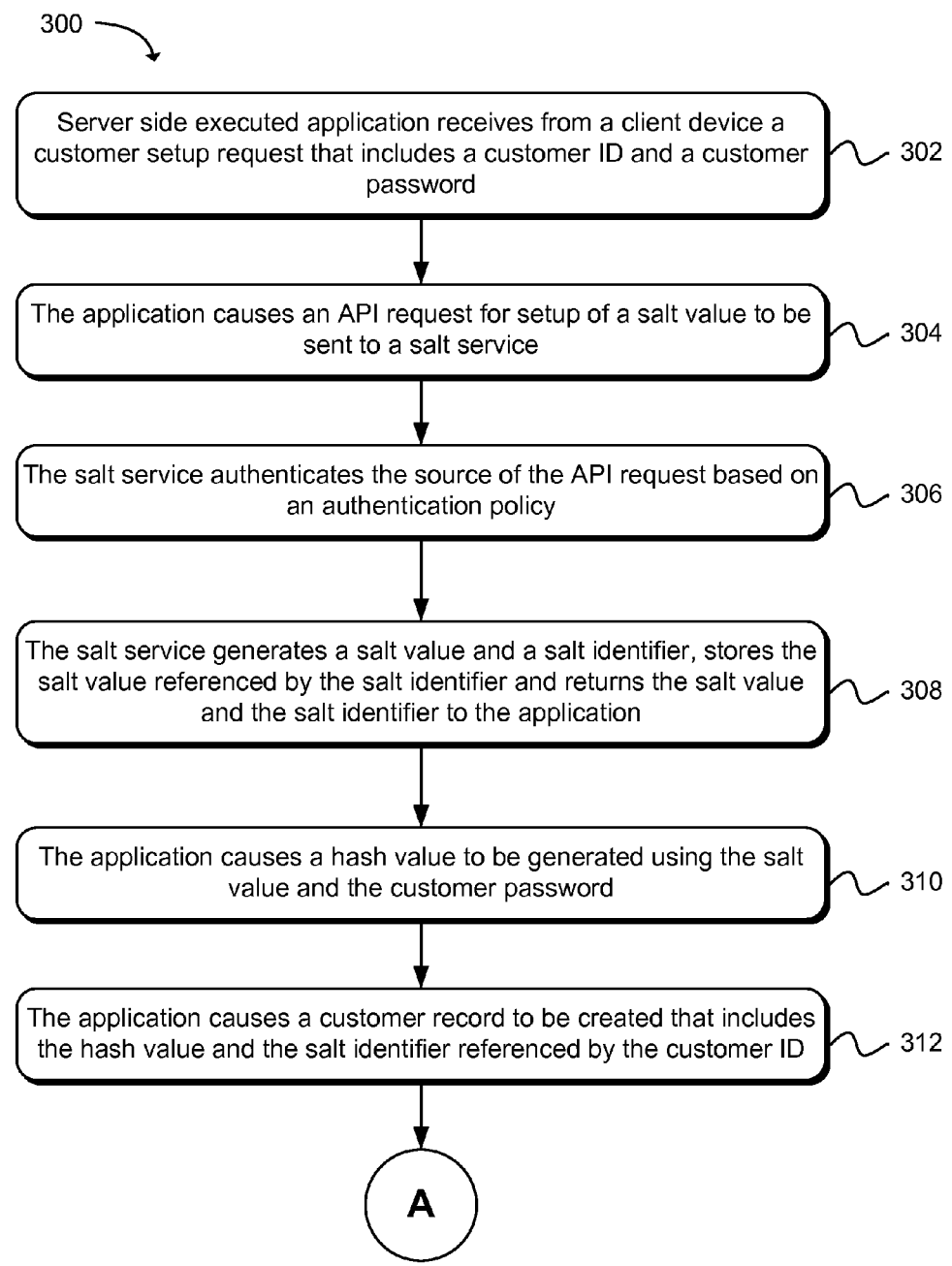
FIG. 3 is a block diagram that illustrates an example method for customer authentication setup using a salt service that provides a salted hash value.

FIG. 3 is a flow diagram illustrating one example method 300 for customer authentication setup using a salt service.

Beginning in block 302, a server side executed application may receive a request from a client device to setup authentication credentials for a customer or client. The setup request may include a customer ID and a customer password that may be used to establish authentication credentials for the customer. As an illustration, a customer seeking access to a system, an application or a service may request authentication credentials that may be used to identify the customer. An application user interface may be provided that allows the customer to enter a customer ID (e.g., a username) and a customer password used in part to identify the customer when the customer attempts to access the application in the future.

Instead of storing the customer password as plain-text, a hash value hash value may be stored in place of the customer password, thereby protecting the customer password from unauthorized persons. For example, the hash value may be generated using a hash function that takes the customer password and a salt value as inputs. In order to obtain a salt value used as an input to a hash function, as in block 304, the application may make an API request to a salt service for setup of a salt value.

As in block 306, the salt service may authenticate a source of the API request based on an authentication policy in order to ensure that the API request is originating from a trusted computing device. An authentication policy may specify credentials and/or information expected to be included with an API request. As one specific example, an authentication policy may specify that an API request include short-term authentication credentials used to identify an authorized computing device. As another specific example, an authentication policy may specify that only API requests received from computing devices having a recognized network address may be answered. The salt service or an authenticating service may analyze the credentials and/or information provided in the API request to determine whether the API request was sent from a trusted computing device and then either respond to the API request when the computing device is trusted, as described below, or ignore the API request when the computing device is not trusted.

After authenticating a source of the API request, as in block 308, the salt service may generate a salt value and a salt identifier. Various aspects of a salt value may be determined by a computing service provider, a system administrator or the like. For example, a salt value may be a random or a pseudo-random value (e.g., a number or alphanumeric value) and may be of a length determined by a system administrator. Likewise, the salt identifier may be a numeric or alphanumeric value of any length, and may be used to identify a salt value. For example, a salt identifier may be used to reference a salt value in a lookup table or a database table. In some examples, the salt identifier may be a random or pseudo-random value. In other examples, the salt identifier may be a default value, such as a table row ID or a customer ID.

After generating the salt value and the salt identifier, the salt service may cause the salt value to be stored so that the salt value is referenced by the salt identifier. The salt value may be securely stored such that the salt service may retrieve the salt value for use in future authentication requests. For example, the salt value may be stored in a data store located on a computing device hosting the salt service, or in a secured remote data store, such that the salt service and salt values are isolated from other computing devices and data stores. The salt service may then return the salt value and the salt identifier to the application that made the API request for setup of a salt value.

Upon receiving the salt value and the salt identifier, as in block 310, the application may, by way of a hash function, generate a hash value using the salt value and the customer password as inputs. Examples of hash functions that may be used to create a hash value include SHA-2, SHA-3, FSB (Fast Syndrome Based Hash), as well as other hash functions. After generating the hash value, the salt value used as an input in generating the hash value may be discarded. As a result, the salt value will not be stored on a computing device hosting the application, and in the event that the computing device may become compromised, unauthorized persons will not have access to the salt value used to generate the hash value.

Having generated a hash value, as in block 312, the hash value may be stored in a customer record that includes the hash value and the salt identifier referenced by the customer ID. The customer record may be stored on a computing device hosting the application, or in a remote data store accessible to the application, such that the customer record may be isolated from a data store storing a respective salt value, thereby separating a hash value from the salt value used to generate the hash value.

Figure 4:
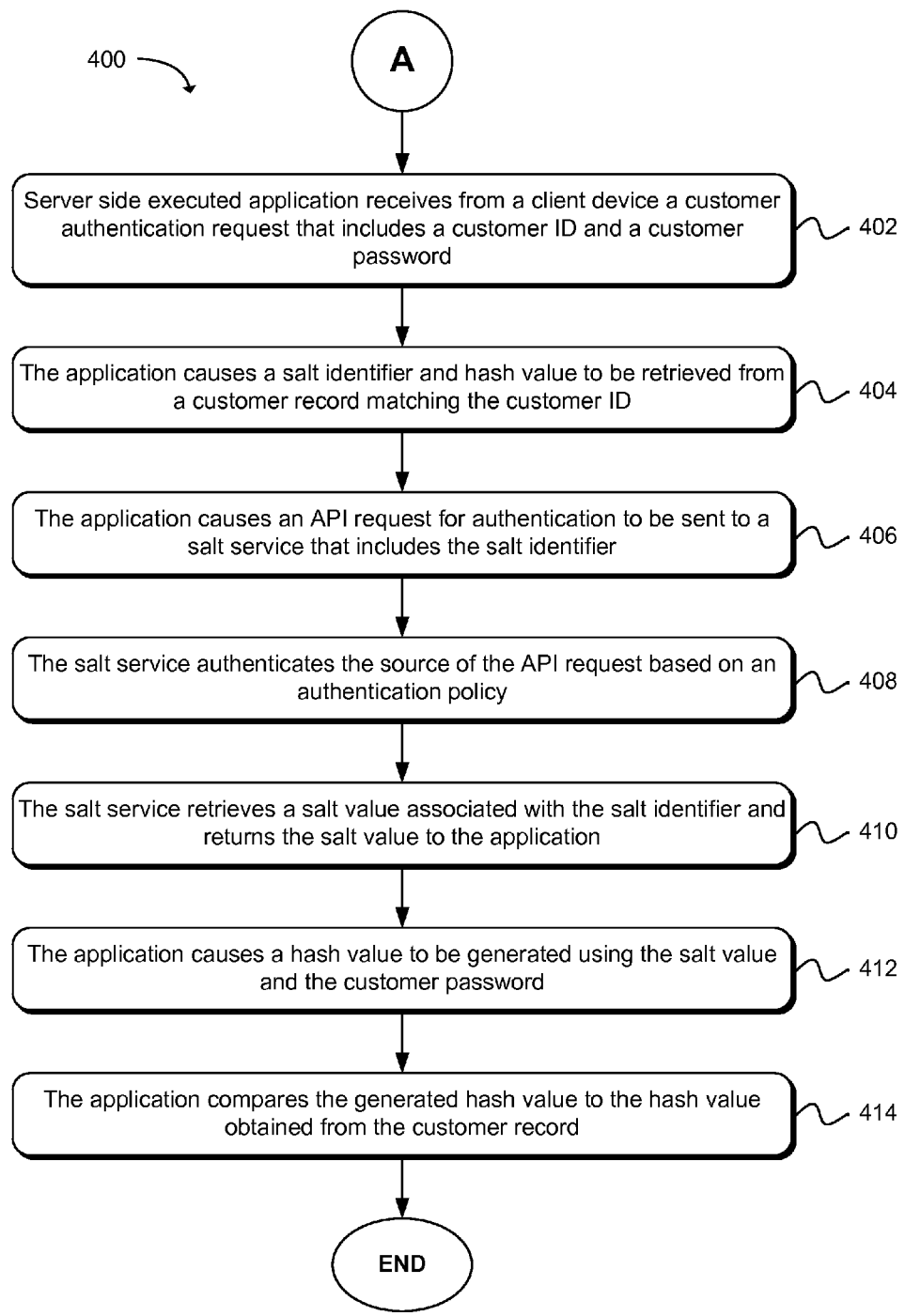
FIG. 4 is a flow diagram illustrating an example method for authenticating a customer using a salt service that provides a salted hash value.

Moving now to FIG. 4, a flow diagram illustrates an example method 400 for authenticating a customer using the salt service described in FIG. 3. Beginning in block 402, a server side executed application may receive from a client device a customer authentication request that includes a customer ID and a customer password. For example, a user interface may be provided to the client device that may be used to enter a customer's authentication credentials (e.g., a customer ID and a customer password). The authentication credentials may be used to identify a customer. As an illustration, a customer seeking access to a system or service may present authentication credentials that may then be used to identify the customer.

Upon receiving the customer's authentication credentials (i.e., the customer ID and the customer password), as in block 404, a salt identifier and a hash value may be obtained from a customer record matching the customer ID. For example, the customer record may be referenced by the customer ID. As in block 406, an API request for authentication may then be sent to a salt service. The API request may be a request for a salt value that may be used as one input along with the customer password to generate a hash value, that may then be compared with the hash value retrieved from the customer record. The API request may include the salt identifier obtained from the customer record, which may be used by the salt service to identify an associated salt value.

As in block 408, the salt service may authenticate a source of the API request based on an authentication policy in order to ensure that the API request is originating from a trusted computing device as described in FIG. 3. Having authenticated the source of the API request, as in block 410, the salt service may retrieve a salt value associated with the salt identifier included in the API request and return the salt value to the application. For example, the salt service may perform a lookup of the salt value in a lookup table using the salt identifier, or the salt service may query a data store containing the salt value using the salt identifier and then return the salt value to the application.

Upon receiving the salt value, as in block 412, the application, by way of a hash function, may generate a hash value using the salt value returned by the salt service and the customer password included in the customer authentication request. A hash function used to generate the hash value may be the same hash function type used to generate the hash value retrieved from the customer record (i.e., the hash value generated in response to the authentication credentials setup request). For example, where an SHA-3 hash function was used to generate a hash value to setup a customer's authentication credentials, the SHA-3 hash function may be used to generate a hash value in response to a customer authentication request.

Having generated the hash value, as in block 414, the generated hash value may be compared to the hash value obtained from the customer record. In a case where the generated hash value and the hash value obtained from the customer record match (i.e., the hash values are identical), then authentication of the customer is successful. In a case where the hash values do not match, the application via a user interface may notify the customer that an incorrect password was submitted.

Figure 5:
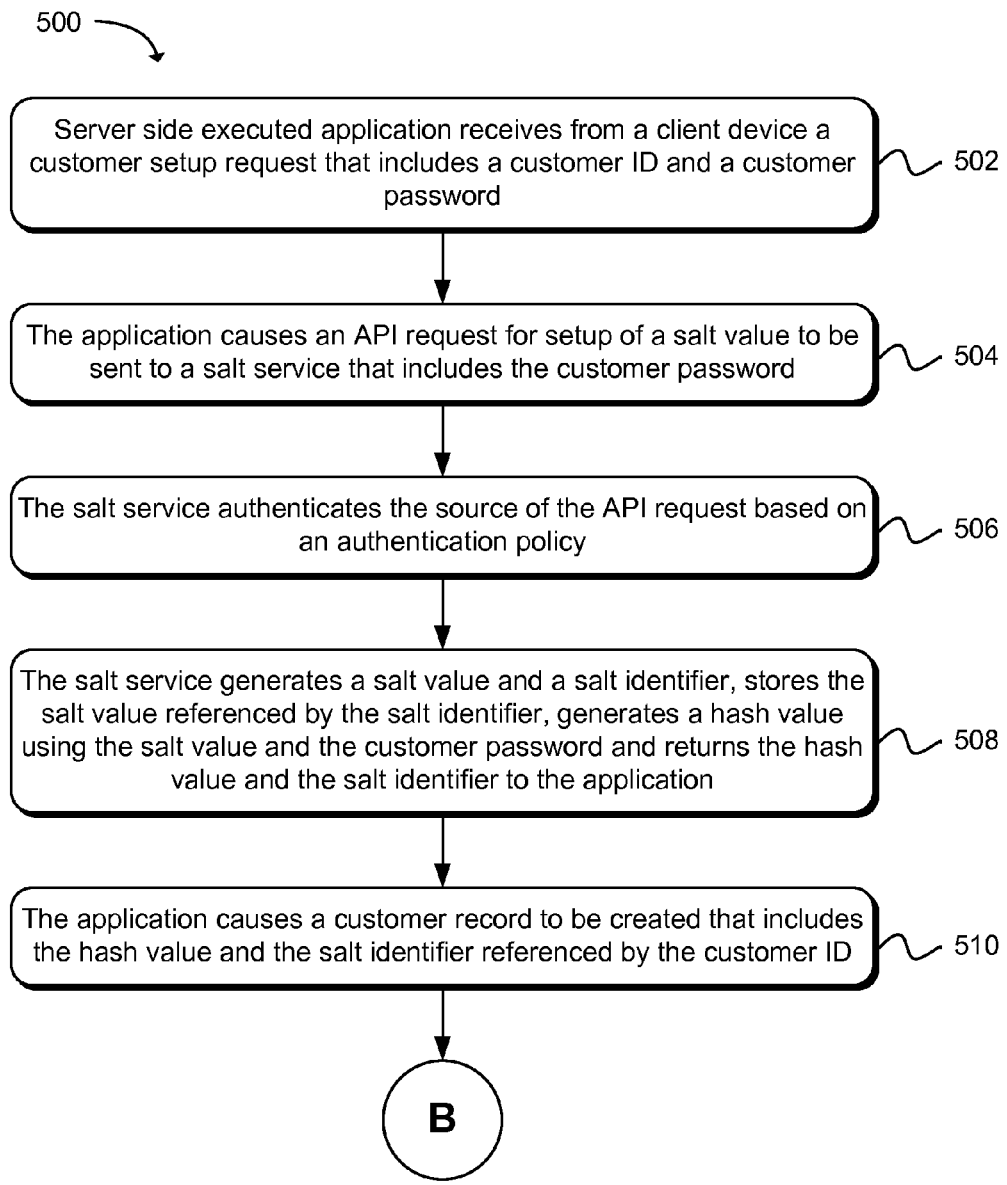
FIG. 5 is a flow diagram that illustrates an example method for customer authentication setup using a salt service that provides a salt value.

FIG. 5 is a flow diagram illustrating another example method 500 for customer authentication setup using a salt service. Starting in block 502, a server side executed application may receive a request from a client device to setup authentication credentials for a customer. The setup request may include a customer ID and a customer password that may be used in establishing authentication credentials for the customer. As in previous example methods, the application may provide a user interface that allows the customer to enter a customer ID and a customer password, that may then be used to create a customer record containing a hash value generated from the customer password and a salt value, and a salt identifier referenced by the customer ID.

As in block 504, the application may cause an API request for setup of a salt value to be sent to a salt service that includes the customer password. Upon receiving the API request, as in block 506, the salt service may authenticate the source of the API request based on an authentication policy in order to ensure that the API request is originating from a trusted computing device as described earlier. After authenticating the source of the API request, as in block 508, the salt service may generate a salt value and a salt identifier. After generating the salt value and the salt identifier, the salt service may cause the salt value to be stored where the salt value may be referenced by the salt identifier. The salt value may be stored so that the salt value may be isolated from other computing devices, applications and services, but may be accessible to the salt service to retrieve the salt value for use in future authentication requests.

The salt service may then, cause a hash value to be generated using a hash function. The hash value may be generated using the salt value and the customer password included in the API request as hash function inputs. The salt service may then return the hash value and the salt identifier to the application that made the API request for setup of a salt value. Upon receiving the hash value and the salt identifier, as in block 510, the hash value may be stored in a customer record that includes the hash value and the salt identifier referenced by the customer ID. The customer record may be stored on the computing device hosting the application, or in a data store accessible to the application, thereby isolating the hash value from the salt value used to generate the hash value.

Figure 6:
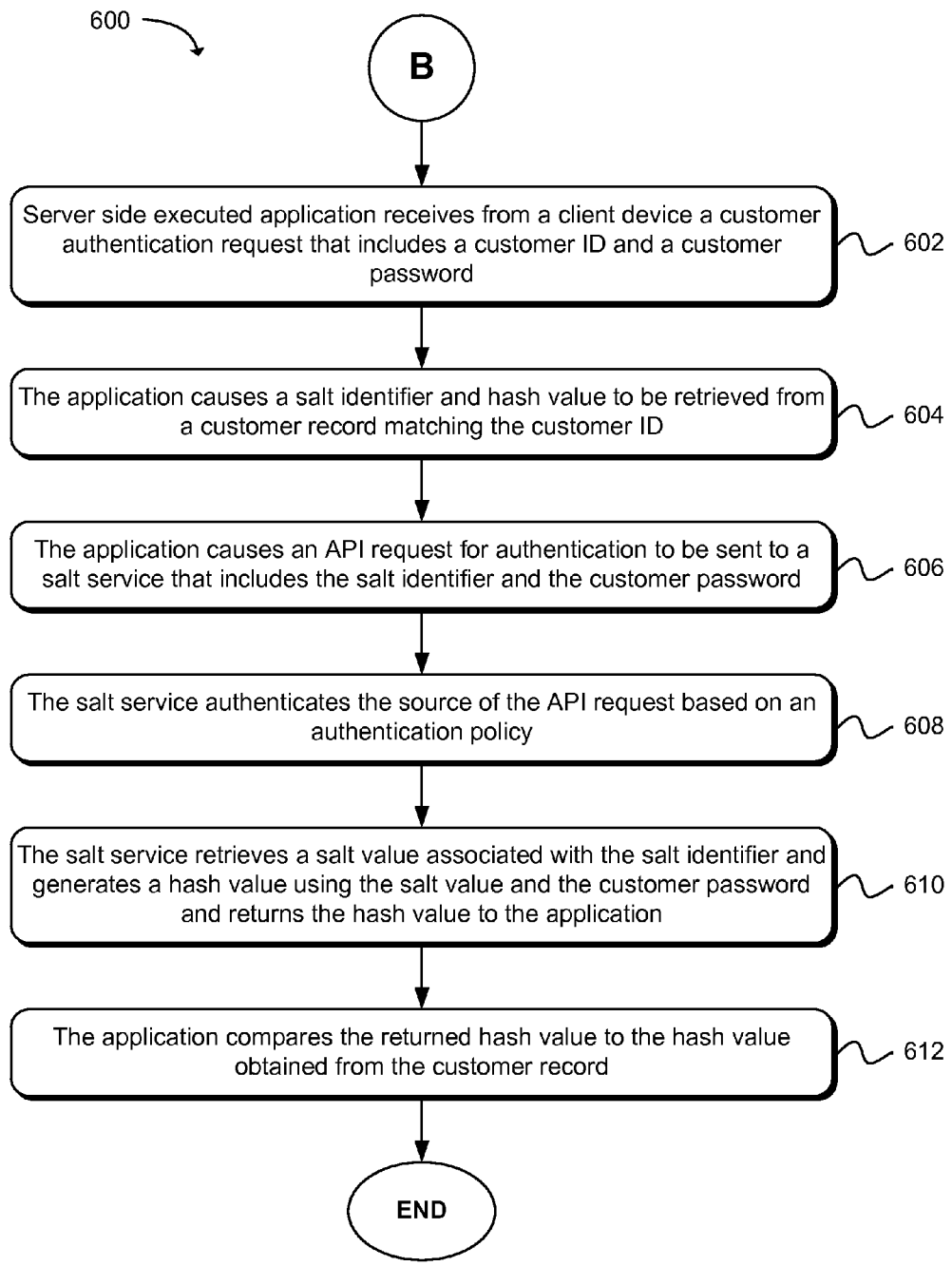
FIG. 6 is a flow diagram illustrating an example method for authenticating a customer using a salt service that provides a salt value.

Moving now to FIG. 6, a flow diagram illustrates an example method 600 for authenticating a customer using the salt service described in FIG. 5. Starting in block 602, a server side executed application may receive from a client device a customer authentication request that includes a customer ID and a customer password. Upon the application receiving the customer ID and the customer password, as in block 604, a salt identifier and a hash value may be obtained from a customer record matching the customer ID. As in block 606, an API request for authentication may then be sent to a salt service. The API request may be a request for a hash value that may be compared to the hash value obtained from the customer record in order to authenticate the identity of the customer. The API request sent to the salt service may include the salt identifier obtained from the customer record, which may be used by the salt service to identify an associated salt value, and the customer password provided in the customer authentication request, which may be used by the salt service as one input to generate a hash value.

As in block 608, the salt service may authenticate a source of the API request based on an authentication policy in order to ensure that the API request is originating from a trusted computing device. After authenticating the source of the API request, as in block 610, the salt service may retrieve a salt value associated with the salt identifier included in the API request and then, using a hash function, generate a hash value using the salt value and the customer password as inputs. The salt service may then return the hash value to the application.

Upon receiving the hash value from the salt service, as in block 612, the application may compare the hash value returned from the salt service to the hash value obtained from the customer record. In a case where the hash value returned from the salt service and the hash value obtained from the customer record are identical, then authentication of the customer is successful. In a case where the hash values do not match, the customer via a user interface may be notified that an incorrect password was submitted.

FIG. 7 is a diagram illustrating an example system and method for validating a salt value setup request and/or a salt value authentication request using an authentication policy specifying credentials used to validate an identity of a requesting server 704. The system may include a computing service environment 702 containing a number of servers 704 and 706 and an identity and access provider 708 that may be in communication with the servers by way of a computing network (e.g., a LAN, WAN or virtual network). The servers 704 may host applications 710 providing network accessible services to customers 718. Customers 718 may access the network accessible services by way of a client device that communicates with the server 704 over a network, such as the Internet.

A server 704 hosting an application 710 may be provided with credentials from an identity and access provider 708 according to an authentication policy specifying credentials used to validate servers 704 making API requests to a salt service 712 for a salt value setup or authentication. For example, an identity and access provider 708 may control access to a salt service 712 by servers 704 by verifying a server's 704 credentials. Illustratively, an authentication policy may specify that a server 704 may be validated using short-term authentication credentials (e.g., temporary security credentials), such as a security token that may be valid for a specified duration and for a specific set of permissions (e.g., customer roles). As one example, a server 704 hosting an application 710 may be registered with an identity and access provider 708 where the server 704 may be issued a security token that the identity and access provider 708 stores in an identity store 714. A salt service 712, upon receiving a request from the application 710 via the server 704, may make an authentication request to the identity and access provider 708 to determine whether the server 704 possesses a valid security token allowing the server 704 to receive a response to the request. The identity and access provider 708 may query the identity store 714 for a security token for the server 704, and if found, respond to the salt service 712 that the server 704 possesses a valid security token. The salt service 712 may then fulfill the application's 710 request.

As another illustration, an authentication policy may specify that a server 704 may be validated using a network address credential that specifies a particular network address (e.g., an IP address) from which a request to a salt service 710 may originate. As one example, a server 704 may register an IP address for the server 704 with an identity and access provider 708 that may in turn store the IP address in an identity store 714. A salt service 712, upon receiving a request from an application 710 hosted on the server 704, may make a request to the identity and access provider 708 that includes the IP address of the server 704. The identity and access provider 708 may then query the identity store 714 to determine whether the IP address is a registered IP address, and if verified, respond to the salt service 712 that the IP address is valid for communications with the salt service 712. The salt service 712 may then fulfill the application's 710 request.

Alternatively, or in addition to an authentication policy that validates an identity of a requesting computing device, a method may be used to deny a salt value setup request or a salt value authentication request when a suspicious activity trigger used to detect unusual activity associated with salt value requests is triggered. One example of unusual activity associated with a suspicious activity trigger may include an unusual number of requests received by a salt service 712 over a short period to time. For example, a trigger may be configured to detect an unusual number of salt value requests made to a salt service 712 over a one second time period received from a trusted source computing device (e.g., a server 704). Multiple requests received within a short time frame originating from a trusted computing device may indicate that the trusted computing device may have been compromised.

Figure 8:
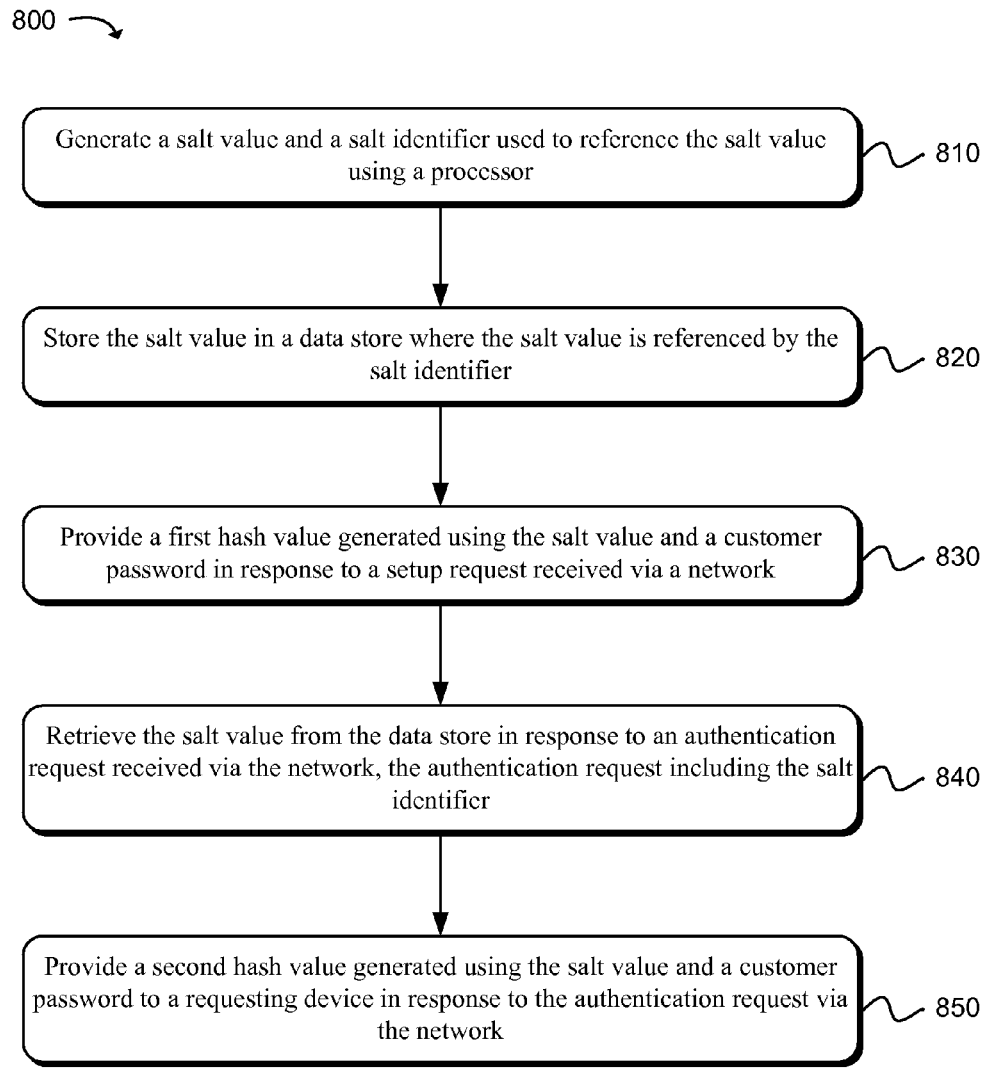
FIG. 8 is a flow diagram illustrating an example method for a salt service that provides a salted hash value to a requesting device.

FIG. 8 is a flow diagram illustrating an example method 800 for a salt service that provides a salted hash value to a requesting device (e.g., a sever hosting a web application). Beginning in block 810, the salt service may generate a salt value and a salt identifier used to reference the salt value upon receiving a salt value setup request from a requesting device. The salt value may be a random value (e.g., numeric or alphanumeric) and the salt identifier may be a default or standard identifier, or may be a random value. As in block 820, the salt service may store the salt value in a data store so that the salt value is referenced by the salt identifier. As such, when querying the data store, the salt value may be identified using the salt identifier.

As in block 830, the salt service may provide a first hash value (i.e., a salted hash value) generated using the salt value and a customer password in response to the salt value setup request. Illustratively, the salt service may use a cryptographic hash function to generate a salted hash value using as inputs a customer password that was included in the salt value setup request, and the salt value generated by the salt service. The salt service may then provide the salted hash value (i.e., the first hash value) to the requesting device via a computing network. The first hash value may then be stored on the requesting device or on a data store accessible to the requesting device for future customer authentications associated with a particular customer.

When authenticating a particular customer, a requesting device may make an authentication request to the salt service. Upon receiving the authentication request, as in block 840, the salt service may retrieve the salt value from the data store using a salt identifier included in the authentication request. As in block 850, the salt service may then provide a second hash value generated using the salt value and a customer password to the requesting device via the network in response to the authentication request. Illustratively, the authentication request may include the customer password used as one input in generating the second hash value, and the salt service may use the same cryptographic hash function used to generate a first hash value to generate the second hash value. Upon receiving the second hash value by the requesting device, the second hash value may be compared with a first hash value. If the first and the second hash values match, then the customer has been successfully identified.

Figure 9:
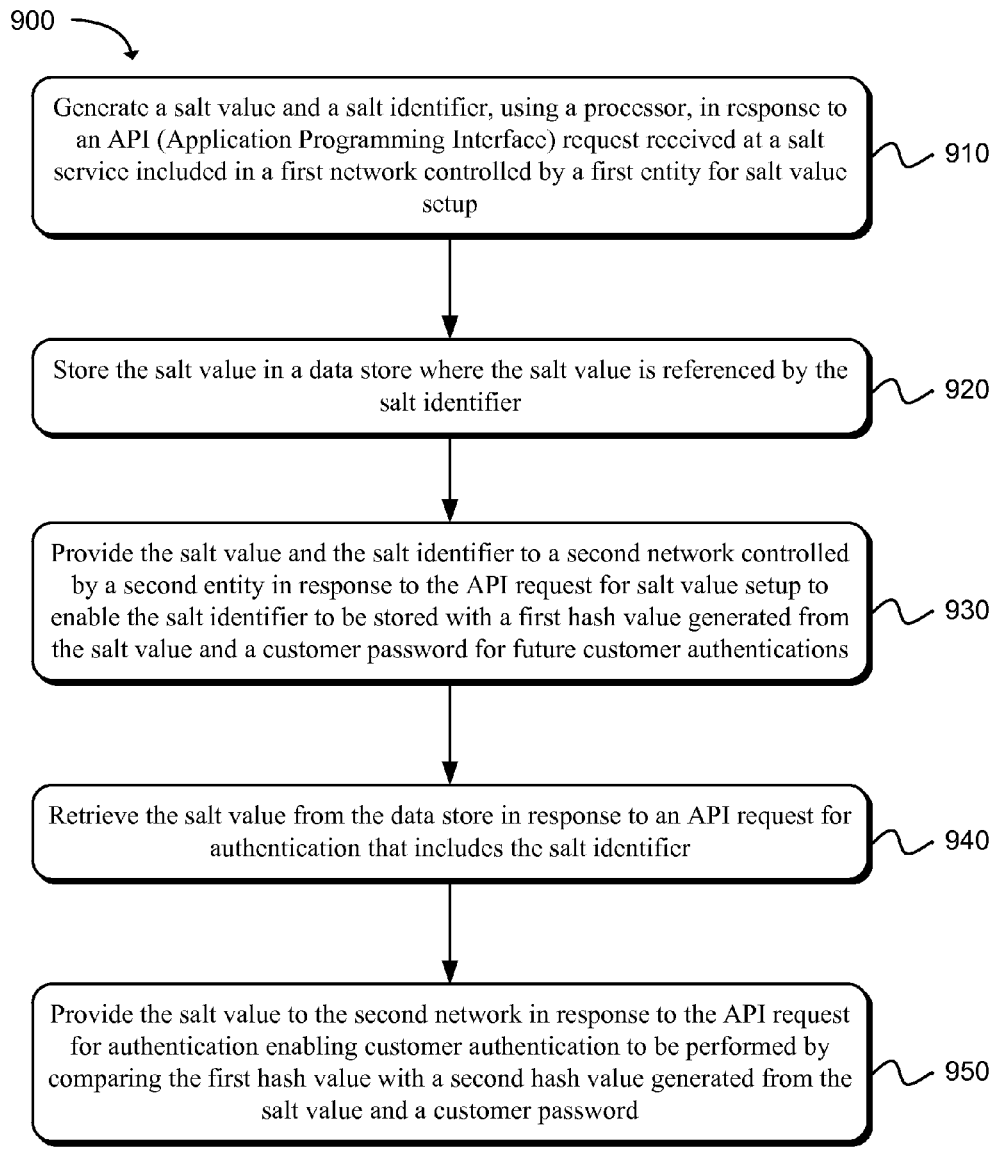
FIG. 9 is a flow diagram that illustrates an example method for a salt service that provides a salt value in response to an API request.

FIG. 9 is a flow diagram illustrating an example method 900 for a salt service that provides a salt value in response to an API request. Starting in block 910, the salt service may generate a salt value and a salt identifier in response to an API request for salt value set up. Then, as in block 920, the salt value may then be stored in a data store accessible to the salt service where the salt value may be referenced by the salt identifier.

After generating the salt value and the salt identifier, as in block 930, the salt service may provide the salt value and the salt identifier in response to the API request for salt value setup to enable the salt identifier to be stored with a first hash value generated from the salt value and a customer password for future customer authentications. Illustratively, the salt value and the salt identifier may be provided to a requesting device where the salt value may be used as one input for a cryptographic hash function, and a customer password may be used as a second input to produce a first hash value. The salt identifier may then be stored with the first hash value in the requesting device, or in a data store accessible to the requesting device for future customer authentications.

As in block 940, in response to an API request for authentication that includes the salt identifier, the salt service may retrieve the salt value from the data store using the salt identifier to identify the salt value. Then, as in block 950, the salt service may provide the salt value in response to the API request for authentication enabling customer authentication to be performed by comparing the first hash value with a second hash value generated from the salt value and a customer password. Illustratively, the salt value may be provided to a requesting device, where the salt value may be used as one input for the cryptographic hash function used to generate the first hash value, and a customer password submitted by a customer may be used as a second input. The first hash value may be retrieved from storage and compared to the second hash function, and if the first and second hash values match, then an associated customer has been successfully authenticated.

Figure 10:
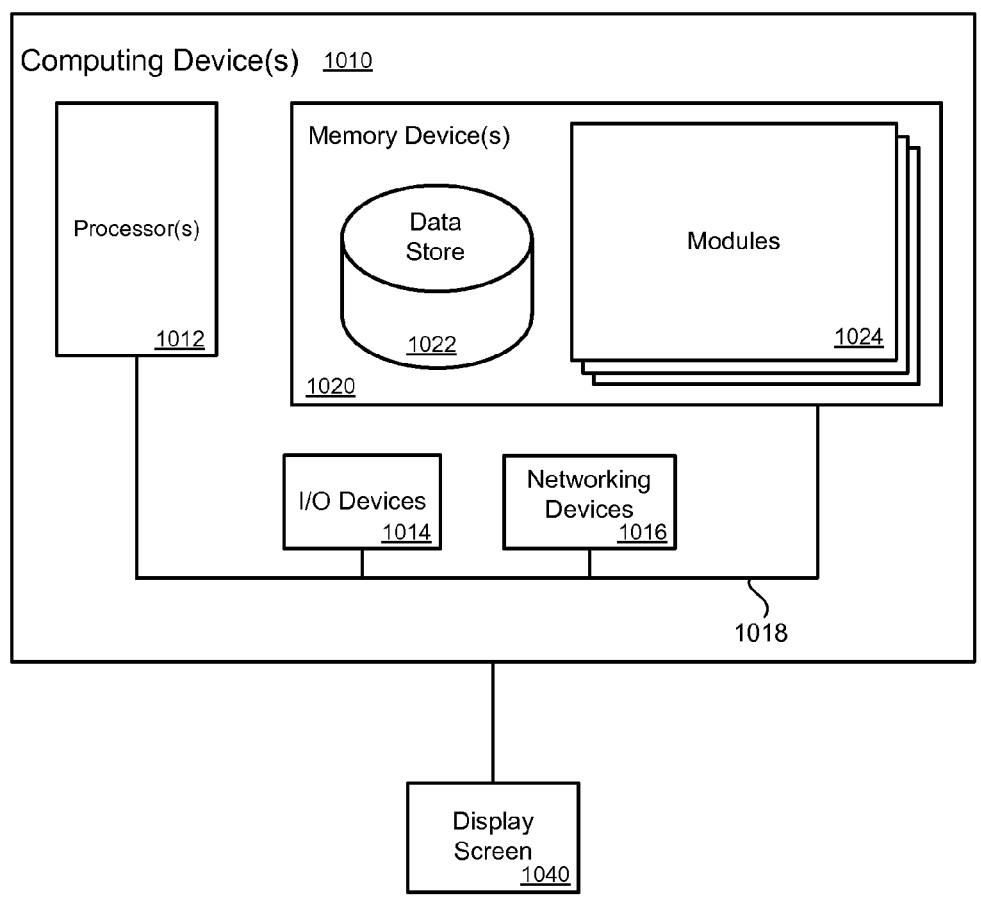
FIG. 10 is block diagram illustrating an example of a computing device that may be used to execute a salt service.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules that are executable by the processor(s) 1012 and data for the modules. For example, the memory device 1020 may contain a salt service that includes a salt module and a hash value module. The modules may execute the functions described earlier. A data store 1022 may also be located in the memory device 1020 for storing data related to the modules and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen 1040 that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
    generate a salt value, using a processor, in response to an API (Application Programming Interface) request for salt value set up received at a salt service included in a first network controlled by a first entity, the API request being validated using an authentication policy, and the salt value is a random number that when combined with a customer password is used to generate a hash value for customer authentication;
    generate a salt identifier used to reference the salt value, using the processor;
    store the salt value in a data store where the salt value is referenced by the salt identifier;
    provide the salt value and the salt identifier to a second network controlled by a second entity in response to the API request for salt value setup to enable the salt identifier to be stored in association with a first hash value generated from the salt value and a customer password for future customer authentications;
    retrieve the salt value from the data store in response to an API request for authentication received at the salt service that is validated by the authentication policy, the API request for authentication including the salt identifier; and
    provide the salt value to the second network in response to the API request for authentication enabling customer authentication to be performed by comparing the first hash value with a second hash value generated from the salt value and a customer password.

2. A non-transitory machine readable storage medium as in claim 1, having instructions that when executed by the processor:
    generate a first hash value using a customer password and the salt value received from the salt service in response to the API request for setup of the salt value;
    store the first hash value referenced by a customer ID for future customer authentications;
    generate a second hash value using a customer password and the salt value received from the salt service in response to the API request for authentication; and
    compare the first hash value with the second hash value to authenticate a customer.

3. A non-transitory machine readable storage medium as in claim 1, wherein instructions executed by the processor validate the request for salt value setup based in part on an authentication policy specifying credentials used to validate a requester selected from at least one of: short-term authentication credentials or network address credentials.

4. A computer implemented method for a salt service, comprising:
    under control of one or more computer systems configured with executable instructions,
        generating a salt value and a salt identifier used to reference the salt value, using a processor;
        storing the salt value in a data store where the salt value is referenced by the salt identifier;
        providing a first hash value generated using the salt value and a customer password in response to a salt value setup request received at the salt service via a communications network;
        retrieving the salt value from the data store in response to an authentication request received at the salt service via the communications network, the authentication request including the salt identifier; and
        providing a second hash value generated using the salt value and a customer password to a requesting device in response to the authentication request via the communications network.

5. A method as in claim 4, wherein providing the first hash value and the salt identifier in response to the salt value setup request further comprises, providing the first hash value and the salt identifier to a server hosting a network accessible application where the server stores the first hash value and the salt identifier for use in future customer authentications, wherein the salt service is included in a first network controlled by a first entity and the server hosting the network accessible application is included in a second network controlled by a second entity.

6. A method as in claim 4, wherein providing the second hash value in response to the authentication request further comprises, providing the second hash value to a server hosting a network accessible application that compares the first hash value with the second hash value.

7. A method as in claim 4, further comprising validating a salt value setup request and a salt value authentication request received via a network using an authentication policy that validates an identity of a requesting computing device.

8. A method as in claim 7, wherein the authentication policy further comprises, validating an identity of the requesting device using short-term authentication credentials that are included in the salt value setup request or the salt value authentication request.

9. A method as in claim 8, wherein the short-term authentication credential is a security token issued by an identity and access provider.

10. A method as in claim 7, wherein the authentication policy further comprises, validating an identity of a requesting device making the salt value setup request or the salt value authentication request via a network address associated with the requesting device.

11. A method as in claim 4, further comprising denying the salt value setup request or a salt value authentication request when a suspicious activity trigger used to detect unusual activity associated with salt value requests is triggered.

12. A method as in claim 11, wherein the suspicious activity trigger used to detect the unusual activity associated with the salt value requests includes detecting an unusual number of salt value requests per second received from a source.

13. A method as in claim 4, further comprising receiving salt value setup requests and salt value authentication requests via an API.

14. A method as in claim 4, wherein the salt service is included in a first network controlled by a first entity that is independent of a second network controlled by a second entity making salt value setup requests and authentication requests to the salt service.

15. A method as in claim 4, further comprising discarding a hash value after providing the hash value to a requesting device in response to the setup request or the authentication request.

16. A method as in claim 4, wherein generating the salt value and the salt identifier further comprises, generating a random value for the salt value and generating a random value for the salt identifier.

17. A salt system comprising:
- a processor;
- a data store for storing salt values;
- a memory device including instructions that, when executed by the processor, cause the system to:
- generate a salt value in response to an API request for salt value setup, wherein the salt value is a random value that when combined with a customer password is used to generate a hash value for customer authentication;
- generate a salt identifier used to reference the salt value;
- store the salt value in the data store in the salt system where the salt value is referenced by the salt identifier;
- provide the salt value and the salt identifier in response to the API request for salt value set up;
- retrieve the salt value from the data store from the salt system in response to an API request for authentication, the API request for authentication including the salt identifier; and
- provide the salt value in response to the API request for authentication.

18. A system as in claim 17, wherein the memory device includes instructions that, when executed by the processor, causes the system to validate an API request associated with a salt value using an authentication policy that specifies various credentials used to authenticate an API request.

19. A system as in claim 17, wherein providing the salt value in response to the API request for the salt value setup enables a requesting device to generate the hash value using the salt value and the customer password and store the hash value referenced by a customer ID for future authentication requests, the salt value being discarded by the requesting device after generating the hash value.

20. A system as in claim 17, wherein providing the salt value in response to the API request for authentication enables the customer authentication to be performed by a requesting device that generates the hash value using the salt value and the customer password and compares the hash value with a stored hash value.

* * * * *